(12) United States Patent
Kinsela

(10) Patent No.: US 8,607,414 B1
(45) Date of Patent: Dec. 17, 2013

(54) SHOCK ABSORBING CASTER ASSEMBLY

(76) Inventor: Owen T. Kinsela, Roadvale (AU)

( * ) Notice: Subject to any disclaimer, the term of this patent is extended or adjusted under 35 U.S.C. 154(b) by 0 days.

(21) Appl. No.: 13/545,831

(22) Filed: Jul. 10, 2012

(51) Int. Cl.
*B60B 33/00* (2006.01)
*A47B 91/00* (2006.01)

(52) U.S. Cl.
USPC ............................................. 16/44; 16/35 D

(58) Field of Classification Search
USPC ...... 16/44, 35 D, 35 R; 188/1.12, 281, 282.1, 188/282.5, 282.6; 280/250.1, 86.1, 483, 280/485; 180/21; 267/153, 195, 196, 257, 267/258, 292, 293
See application file for complete search history.

(56) References Cited

U.S. PATENT DOCUMENTS

| | | | |
|---|---|---|---|
| 2,738,542 A | 3/1956 | Clark, Jr. | |
| 2,942,290 A * | 6/1960 | Segal | 16/35 R |
| 4,212,092 A | 7/1980 | Ferrari | |
| 4,319,381 A | 3/1982 | Rodaway | |
| 4,346,498 A * | 8/1982 | Welsch et al. | 16/44 |
| 4,485,521 A * | 12/1984 | Welsch et al. | 16/44 |
| 4,559,669 A * | 12/1985 | Bonzer et al. | 16/44 |
| 4,906,014 A * | 3/1990 | Nanzai | 280/47.2 |
| 5,400,469 A | 3/1995 | Simonsen | |
| 6,594,856 B1 * | 7/2003 | Cherukuri | 16/34 |
| 2006/0288526 A1 * | 12/2006 | Larson | 16/44 |

FOREIGN PATENT DOCUMENTS

| | | | |
|---|---|---|---|
| JP | 2004106803 A | * | 4/2004 |
| JP | 2005199779 A | * | 7/2005 |

* cited by examiner

*Primary Examiner* — Chuck Mah

(57) ABSTRACT

A shock absorbing caster assembly that includes a wheel volubly disposed within a spring bracket, said spring bracket pivotally disposed within a mounting bracket, said spring bracket compressively engagable with the mounting bracket by means of a parallelepiped spring member torsionally engaging with a plate member of the mounting bracket, wherein a wheel axle is permitted to move within extremes delimited by a pair of curved slots disposed upon the mounting bracket whereby the wheel is moveable upwardly against the action of the spring member when the present shock absorbing caster assembly is piloted over an uneven ground surface.

3 Claims, 4 Drawing Sheets

SHOCK ABSORBING CASTER ASSEMBLY

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of shock absorbing caster wheel assemblies are known in the prior art. However, what is needed is a shock absorbing caster assembly that includes a wheel volubly disposed within a spring bracket, said spring bracket pivotally disposed within a mounting bracket, said spring bracket compressively engagable with the mounting bracket by means of a parallelepiped spring member torsionally engaging with a plate member of the mounting bracket, wherein a wheel axle is permitted to move within extremes delimited by a pair of curved slots disposed upon the mounting bracket whereby the wheel is moveable upwardly against the action of the spring member when the present shock absorbing caster assembly is piloted over an uneven ground surface.

FIELD OF THE INVENTION

The present invention relates to a shock absorbing caster assembly, and more particularly, to a shock absorbing caster assembly that includes a wheel volubly disposed within a spring bracket, said spring bracket pivotally disposed within a mounting bracket, said spring bracket compressively engagable with the mounting bracket by means of a parallelepiped spring member torsionally engaging with a plate member of the mounting bracket, wherein a wheel axle is permitted to move within extremes delimited by a pair of curved slots disposed upon the mounting bracket whereby the wheel is moveable upwardly against the action of the spring member when the present shock absorbing caster assembly is piloted over an uneven ground surface.

SUMMARY OF THE INVENTION

The general purpose of the shock absorbing caster assembly, described subsequently in greater detail, is to provide a shock absorbing caster assembly which has many novel features that result in a shock absorbing caster assembly which is not anticipated, rendered obvious, suggested, or even implied by prior art, either alone or in combination thereof.

Many shock absorbing caster wheel assemblies are seen in the prior art, but what is needed is a shock absorbing caster assembly that includes a wheel volubly disposed within a spring bracket, said spring bracket pivotally disposed within a mounting bracket, said spring bracket compressively engagable with the mounting bracket by means of a parallelepiped spring member torsionally engaging with a plate member of the mounting bracket, wherein a wheel axle is permitted to move within a pair of curved slots disposed upon the mounting bracket whereby the wheel is moveable upwardly against the action of the spring member when, for example, the present shock absorbing caster assembly is piloted over an uneven ground surface.

The present shock absorbing caster assembly, therefore, includes a mounting bracket releasably attachable to a shopping cart. A spring bracket is pivotally disposed within the mounting bracket, and a wheel is volubly disposed within the spring bracket. The wheel is volubly disposed within the spring bracket by means of a wheel axle inserted through a second hole disposed on each of a pair of side prongs disposed on the spring bracket. The wheel axle is also inserted through each curved slot disposed in each of a pair of side members disposed upon the mounting bracket. Thusly, the wheel axle is moveable upwardly and downwardly within the curved slot disposed on each of the pair of side members of the mounting bracket between an uppermost extreme and a lowermost extreme, and the spring bracket and the wheel are thusly moveable thereupon, said spring bracket pivoting upon a panhead bolt inserted through a bolt hole disposed upon the mounting bracket and a first hole disposed upon each side prong of the spring bracket.

The spring bracket includes a center piece oriented at approximately 45 degrees relative a plate member of the mounting bracket. The center piece has an upper edge and a lower edge and a pair of side edges. An arced portion is disposed upon the upper edge, and the spring member is disposed upon the arced portion, said spring member disposed in a plane between approximately 45 degrees with respect to the plate member and a plane parallel with the plate member of the mounting bracket. The arced portion torsionally engages the spring member in contact with the plate member of the mounting bracket such that when the spring bracket is compressed upwardly, when for example the wheel is piloted over an uneven ground surface, the spring member torsionally engages with the plate member of the mounting bracket and the wheel is forced to remain in contact with the ground while upward compression of the wheel is enabled. Thusly the tensility of the spring bracket against the plate member enables upward compression of the wheel while absorbing the force of such upward compression such that the wheel is forced to remain in contact with the ground.

The present shock absorbing caster assembly requires few moving parts. It is an efficient design well suited for production and accordant with its intended use and purpose. Other caster wheel assemblies, as evinced in the prior art, have many pieces and parts and are more expensive and intricate to produce. Most require the use of coiled springs which are more likely to lose tensility and elasticity over time. The parallelepiped spring member as used in the present shock absorbing caster assembly is more durable, relying on tensile strength across a single plane, rather than a coiled spring.

Moreover, the present shock absorbing caster assembly is installable on extant shopping carts, as desired, to enable more expedient direction of said shopping carts over uneven ground surfaces. It is envisioned that the present shock absorbing caster assembly will be installable centrally upon an extant shopping cart undersurface to augment the function of the extant wheels disposed thereupon, but enable greater control and maneuverability thereby. Moreover, the present shock absorbing caster assembly is envisioned for use with newly manufactured shopping carts enabling easier, more expedient direction of said shopping carts when used during shopping.

Many times a loaded cart contacts a bump while being directed, and jolts uncomfortably against the user, forces food items around, and even damages items transported within the cart. Moreover, the noise of carts jostling across uneven ground surfaces is unpleasant and distracting. Use of the present shock absorbing caster assembly will address these and other concerns by enabling shock absorption while the cart is directed over uneven ground surfaces. The cart wheels will not jostle off the ground as much, resulting in smoother and quieter direction of said cart and, thusly, an overall more pleasant shopping experience.

Thus has been broadly outlined the more important features of the present shock absorbing caster assembly so that the detailed description thereof that follows may be better understood and in order that the present contribution to the art may be better appreciated.

Objects of the present shock absorbing caster assembly, along with various novel features that characterize the invention are particularly pointed out in the claims forming a part of this disclosure. For better understanding of the shock absorbing caster assembly, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
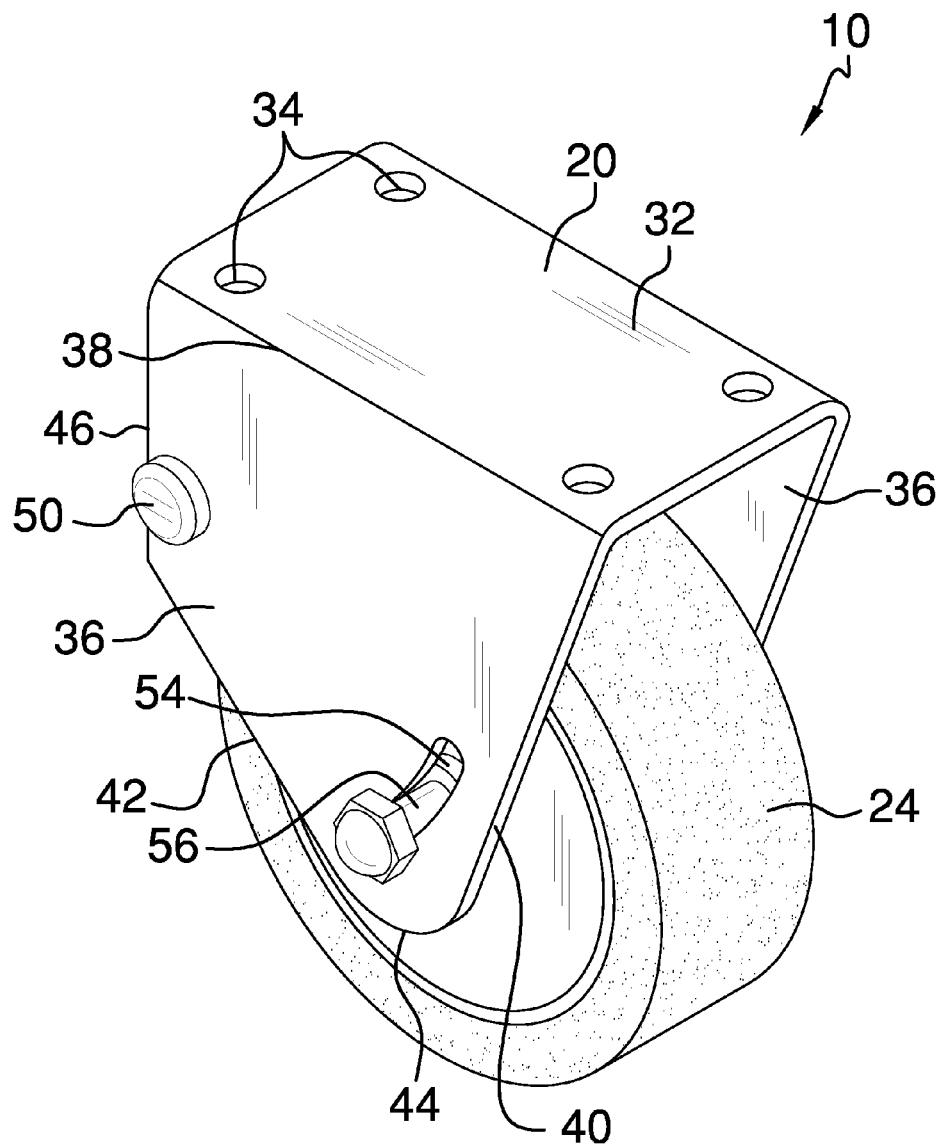
FIG. 1 is an isometric view.
Figure 2:
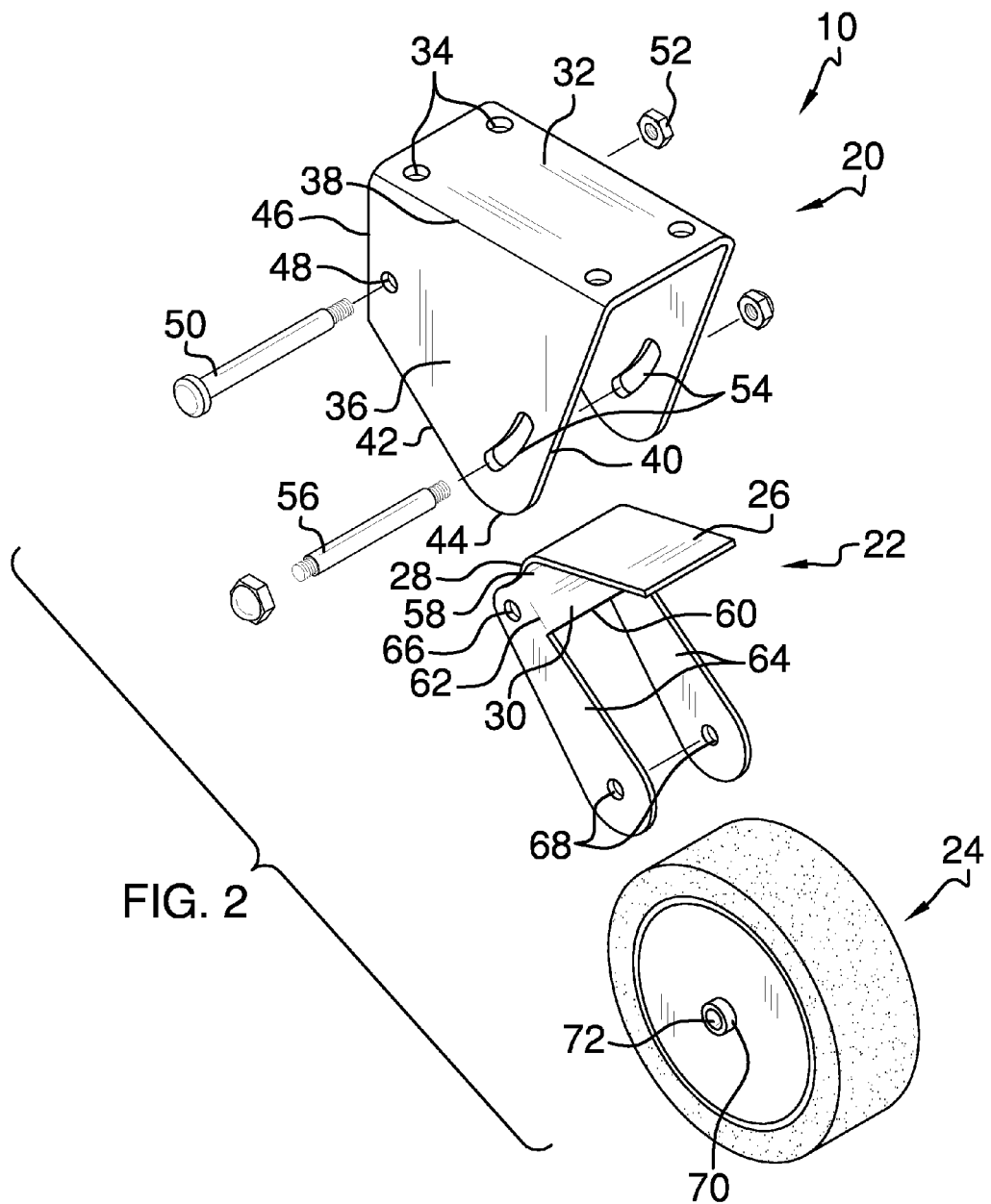
FIG. 2 is an exploded view.
Figure 3:
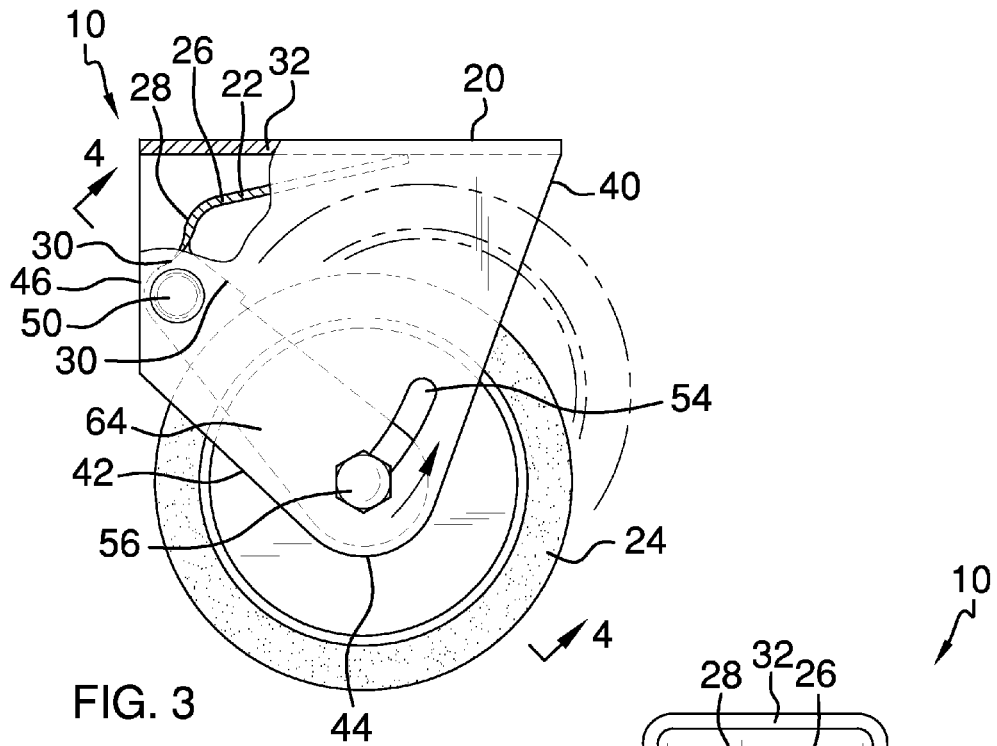
FIG. 3 is a side view.
Figure 4:
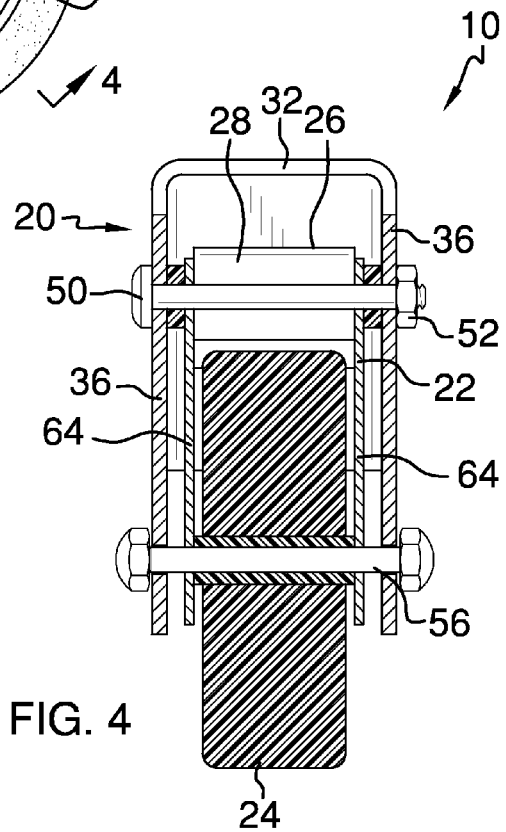
FIG. 4 is a cross-section view taken along the line 4-4 of FIG. 3.
Figure 5:
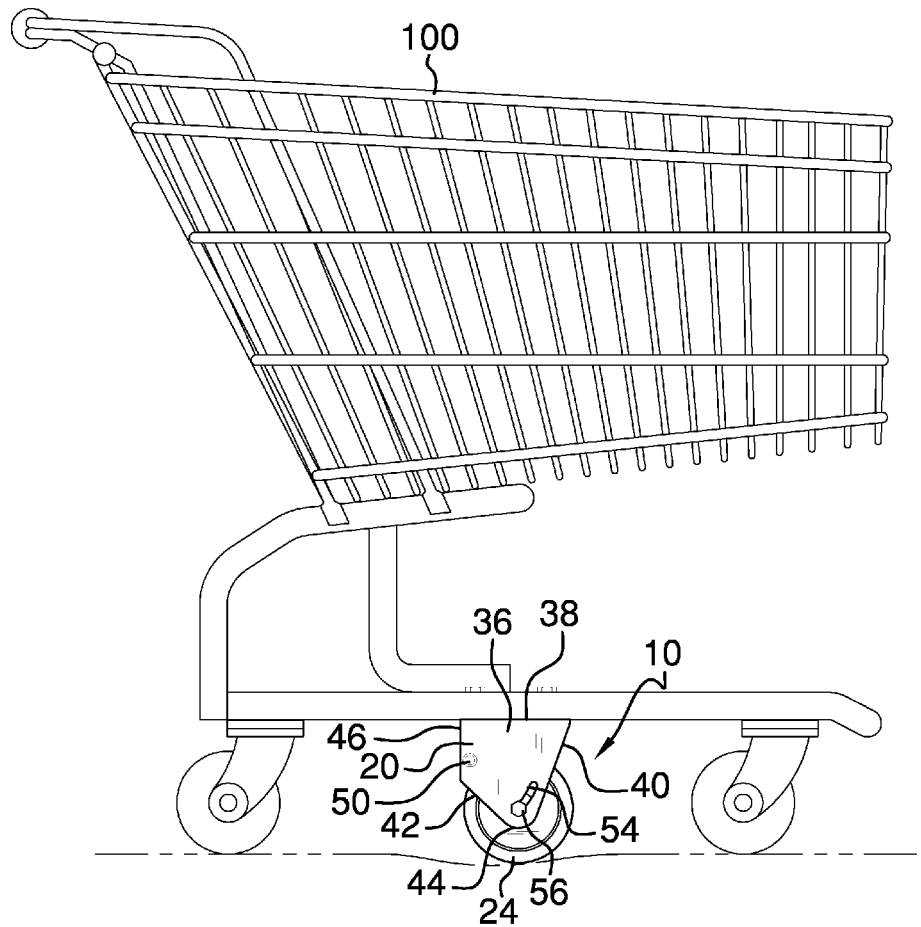
FIG. 5 is an in-use view illustrating the situation of a shock absorbing caster assembly installed upon an extant shopping cart.

With reference now to the drawings, and in particular FIGS. 1 through 5 thereof, example of the instant shock absorbing caster assembly employing the principles and concepts of the present shock absorbing caster assembly and generally designated by the reference number 10 will be described.

Referring to FIGS. 1 through 5 a preferred embodiment of the present shock absorbing caster assembly 10 is illustrated.

The shock absorbing caster assembly 10 includes a mounting bracket 20, a spring bracket 22, and a wheel 24. The mounting bracket 20 is configured to be releasably attachable to an extant shopping cart 100. The spring bracket 22 is configured to moveably secure the wheel 24 within the mounting bracket 20 while providing for upward compression of the wheel 24 by means of a parallelepiped spring member 26, disposed upon an arced portion 28 of a center piece 30, torsionally engaging with a parallelepiped plate member 32 disposed on the mounting bracket 20, as will be described subsequently.

Discussing now the mounting bracket 20, a plurality of holes 34 is disposed in the plate member 32, each of said plurality of holes 34 configured to releasably receive an extant fastener (not shown) therethrough whereby the mounting bracket 20 is releasably securable upon an extant shopping cart 100. It is envisioned that the present shock absorbing caster assembly 10 is installable on extant shopping carts, as desired, to enable more control and expedient direction of said shopping carts, as desired. However, as should be readily apparent, the present shock absorbing caster assembly 10 is installable at the point of manufacture of new shopping carts, as desired.

A pair of side members 36 is disposed perpendicularly from either length of the parallelepiped plate member 32, each of said side members 36 comprising an irregular polygon. Each of the pair of side members 36 is a mirror image of the other side member 36, and each of the pair of side members 36 includes a first side 38 disposed connected to a length of the plate member 32. A second side 40 is disposed in a plane perpendicular with respect to the plate member 32, the second side 40 disposed at an acute angle with respect to the first side 38. A third side 42 is disposed upon a rounded bend 44 disposed endwise upon the second side 40, said third side 42 disposed angularly therefrom to join a fourth side 46 disposed right-angularly with respect to the first side 38.

A bolt hole 48 is disposed upon each of the side members 36, said bolt hole 48 disposed proximal a corner where the third side 42 and the fourth side 46 join. A panhead bolt 50 is releasably insertable through each bolt hole 48, said panhead bolt 50 releasably securing the spring bracket 22 within the mounting bracket 20 by means of a first nut 52 releasably securing the panhead bolt 50 in position.

A curved slot 54 is disposed upon each of the side members 36 proximal to the rounded bend 44 where the second side 40 and the third side 42 join. Each curved slot 54 is configured to removably receive a wheel axle 56 therethrough, said wheel axle 56 configured to moveably position within each curved slot 54 when the wheel 24 is compressed upwardly when the shock absorbing caster assembly 10 is used over an uneven ground surface. The wheel axle 56 also releasably secures the spring bracket 22 within the mounting bracket 20. The wheel axle 56 also releasably secures the wheel 24 within the spring bracket 22, as will be described subsequently.

Discussing now the spring bracket 22 releasably secured within the mounting bracket 20, the spring bracket 22 includes the parallelepiped center piece 30 having an upper edge 58, a lower edge 60, and a pair of side edges 62. The center piece 30 is oriented approximately at 45 degrees relative the horizontal. The arced portion 28 is disposed upwardly from the upper edge 58 and the parallelepiped spring member 26 is disposed upon the arced portion 28, said spring member 26 oriented approximately 90 degrees with respect to the center piece 30, along a plane between approximately 45 degrees relative the plate member 32 of the mounting bracket 20 and parallel to said plate member 32. The spring member 26 is configured to torsionally engage with the mounting bracket 20 plate member 32 when the spring bracket 22 is compressed upwardly as when, for example, the present shock absorbing caster assembly 10 is piloted across an uneven ground surface.

Each of a pair of side prongs 64 is disposed upon each of the pair of side edges 62 of the spring bracket 22, each of said side prongs 64 disposed angularly downward from the center piece 30. Each of the pair of side prongs 64 occupies a plane disposed at 90 degrees relative the plane in which the center piece 30 is disposed, however each of the pair of side prongs 64 is situated approximately 45 degrees relative the horizontal and thus extends downwardly from the plane in which the center piece 30 is disposed (see FIG. 2). The pair of side prongs 64 is configured to receive and support the wheel 24 therebetween.

A first hole 66 is disposed on each side prong 64 proximal the center piece 30, said first hole 66 configured to releasably receive the panhead bolt 50 therethrough. The spring bracket 22 is therefore releasably secured within the mounting bracket 20 when the panhead bolt 50 is releasably inserted through each bolt hole 48 disposed in the mounting bracket 20 and each first hole 66 disposed in each side prong 62. It should be realized that the spring bracket 22 is therefore pivotably disposed within the mounting bracket 20 upon the panhead bolt 50.

A second hole 68 is disposed on each side prong 64 spaced apart from the first hole 66, said second hole 68 configured to releasably receive the wheel axle 56 therethrough. The wheel 24 includes a pair of bushings 70 disposed circumferentially around each of a pair of axle holes 72. Thusly, the wheel 24 is fittable between the pair of side prongs 64 when the pair of bushings 70 are aligned with the second hole 68 disposed upon each of the pair of side prongs 64. Each second hole 68 aligns with each of the curved slots 54 disposed upon the mounting bracket 20. When the wheel axle 56 is inserted through each curved slot 54, the second hole 68 disposed upon each of the pair of side prongs 64, and also through the axle holes 72 disposed upon the wheel 24, said wheel 24 is volubly disposed between the pair of side prongs 64 and releasably secured to the spring bracket 22, said spring bracket 22 secured within the mounting bracket 20.

The spring bracket 22 is maintained in a situation within the mounting bracket 20 by means of the wheel axle 56 engaging with the curved slot 54 disposed on each side member 36 of the mounting bracket 20. Thusly, each curved slot 54 demarks the extremes of movement of the wheel 24 upwardly and alternately downwardly with respect to the mounting bracket 20. The spring member 26, torsionally engaging with the mounting bracket 20, enables shock absorption of the present shock absorbing caster assembly 10. Thusly, when the present shock absorbing caster assembly 10 is piloted over an uneven ground surface, and the wheel 24 is forced upwardly, the tension of the spring member 26 pressured against the mounting bracket 20 plate member 32 acts to absorb the force, and the wheel 24 is maintained upon the ground surface, while the tensile force of the spring member 26 presses the wheel in contact with the ground against the upward compression.

It should be noted that the curved slot 54 disposed in each side member 36 of the mounting bracket 20 maintains the wheel axle 56 within positional norms delimited by the uppermost and lowermost extremes of each curved slot 54. The uppermost extreme of each curved slot 54 prevents permanent deformation of the spring member 26 by preventing upward movement of the wheel 24 beyond a certain point accordant with the elastic limit of the spring member 26. Likewise, the lowermost extreme of the curved slot 54 disposed on each side member 36 of the mounting bracket 20 maintains the spring bracket 22 within the mounting bracket 20 should the present shock absorbing caster assembly 10 be lifted off the ground, as when, for example, the shopping cart 100 to which said shock absorbing caster assembly 10 is attached is lifted. When such occurs, replacing the shock absorbing caster assembly 10 back on the ground surface can occur without the spring bracket 22 requiring resetting within the mounting bracket 20 as may otherwise occur should the wheel axle 56 be permitted to move downwardly beyond the lowermost extreme delimited by each curved slot 54.

What is claimed is:

1. A shock absorbing caster assembly comprising:
  a mounting bracket comprising:
    a plate member;
    a plurality of holes disposed in the plate member;
    a pair of side members disposed perpendicularly from either length of the plate member, each of said side members comprising an irregular polygon;
    a bolt hole disposed upon each of the side members;
    a curved slot disposed on each of the side members;
    a panhead bolt releasably insertable through each bolt hole;
    a wheel axle configured to moveably position within extremes delimited by each curved slot;
  a spring bracket mounted within the mounting bracket, said spring bracket comprising:
    a center piece having an upper edge, a lower edge, and a pair of side edges;
    an arced portion disposed upwardly from the upper edge;
    a parallelepiped spring member disposed upon the arced portion, said spring member configured to torsionally engage with the mounting bracket plate member when the spring bracket is compressed upwardly;
    each of a pair of side prongs disposed upon each of the pair of side edges, each of said side prongs disposed angularly downward from the center piece; and
  a wheel having a pair of bushings disposed between each of the pair of side prongs;
  wherein the panhead bolt releasably inserts through each bolt hole to releasably secure the spring bracket within the mounting bracket and the wheel axle releasably inserts through each curved slot to releasably secure the wheel within the mounting bracket whereby upward movement of the wheel, when forced thereto, is accommodated within extremes delimited by each curved slot;
  wherein the mounting bracket is installable on an extant shopping cart whereby upward compression of the wheel is absorbed by means of the spring bracket torsionally engaging with the mounting bracket.

2. The shock absorbing caster assembly of claim 1 wherein the spring bracket further comprises:
  a first hole disposed on each side prong proximal the center piece, said first hole configured to releasably receive the panhead bolt therethrough;
  a second hole disposed on each side prong, said second hole configured to releasably receive the wheel axle therethrough;
  wherein the wheel is rotatably secured within the spring bracket by means of the wheel axle and the spring bracket is moveably secured within the mounting bracket, whereby the spring bracket is pivotable around the panhead bolt within the extremes delimited by the curved slot disposed upon each of the pair of side members of the mounting bracket.

3. A shock absorbing caster assembly comprising:
  a mounting bracket comprising:
    a parallelepiped plate member;
    a plurality of holes disposed in the plate member, each of said plurality of holes configured to releasably receive an extant fastener therethrough whereby the mounting bracket is releasably securable upon an extant shopping cart;
    a pair of side members disposed perpendicularly from either side of the length of the parallelepiped plate member, each of said side members comprising an irregular polygon;
    a bolt hole disposed upon each of the side members;
    a curved slot disposed upon each of the side members;
    a panhead bolt releasably insertable through each bolt hole;
    a wheel axle configured to moveably position within extremes delimited by each curved slot;
  a spring bracket mounted within the mounting bracket, said spring bracket comprising:
    a parallelepiped center piece having an upper edge, a lower edge, and a pair of side edges;
    an arced portion disposed upwardly from the upper edge;
    a parallelepiped spring member disposed upon the arced portion, said spring member configured to torsionally engage with the mounting bracket plate member when the spring bracket is compressed upwardly;

each of a pair of side prongs disposed upon each of the pair of side edges, each of said side prongs disposed angularly downward from the center piece;

a first hole disposed on each side prong proximal the center piece, said first hole configured to releasably receive the panhead bolt therethrough;

a second hole disposed on each side prong, said second hole configured to releasably receive the wheel axle therethrough;

a wheel having a pair of bushings disposed between each of the pair of side prongs;

wherein the wheel is rotatably secured within the spring bracket by means of the wheel axle and the spring bracket is moveably secured within the mounting bracket thereupon, whereby the spring bracket is pivotable around the panhead bolt;

wherein the panhead bolt is releasably insertable through each first hole to releasably secure the spring bracket within the mounting bracket;

wherein the wheel axle releasably inserts through each curved slot to enable upward compression of the wheel, said compression forcibly resisted by means of the spring bracket torsionally engaging with the mounting bracket; and wherein the mounting bracket is installable on an extant shopping cart whereby upward motion of the wheel is elastically absorbed by means of the spring bracket torsionally engaging with the mounting bracket.

* * * * *